United States Patent
Wang et al.

(10) Patent No.: US 10,127,883 B2
(45) Date of Patent: Nov. 13, 2018

(54) FRAME RATE CONTROL METHOD AND IMAGE PROCESSING APPARATUS SELECTIVELY LIMITING FRAME RATE

(71) Applicant: MEDIATEK INC., Hsin-Chu (TW)

(72) Inventors: Wei-Ting Wang, Taipei (TW);
Yingshiuan Pan, Kaohsiung (TW);
Chih-Yuan Hsiao, New Taipei (TW);
Chien-Ming Chiu, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 75 days.

(21) Appl. No.: 15/181,418

(22) Filed: Jun. 14, 2016

(65) Prior Publication Data
US 2017/0116951 A1    Apr. 27, 2017

Related U.S. Application Data

(60) Provisional application No. 62/246,623, filed on Oct. 27, 2015.

(51) Int. Cl.
| | |
|---|---|
| *G06T 1/00* | (2006.01) |
| *G09G 5/00* | (2006.01) |
| *H04L 12/64* | (2006.01) |

(52) U.S. Cl.
CPC .............. *G09G 5/001* (2013.01); *G09G 5/006* (2013.01); *H04L 12/6418* (2013.01); *G09G 2320/041* (2013.01); *G09G 2340/0435* (2013.01); *G09G 2340/16* (2013.01); *G09G 2350/00* (2013.01); *G09G 2360/08* (2013.01)

(58) Field of Classification Search
None
See application file for complete search history.

(56) References Cited

U.S. PATENT DOCUMENTS

| | | | | |
|---|---|---|---|---|
| 6,108,447 | A * | 8/2000 | Lord | G06T 9/007 |
| | | | | 345/420 |
| 6,754,267 | B1 * | 6/2004 | Shimanaka | H04N 21/4143 |
| | | | | 375/240.03 |
| 8,291,460 | B1 * | 10/2012 | Peacock | H04N 7/188 |
| | | | | 725/90 |
| 2006/0290796 | A1 * | 12/2006 | Nikkanen | H04N 9/735 |
| | | | | 348/294 |
| 2007/0057952 | A1 * | 3/2007 | Swedberg | G09G 5/00 |
| | | | | 345/474 |
| 2007/0188506 | A1 * | 8/2007 | Hollevoet | G06T 1/60 |
| | | | | 345/530 |
| 2009/0052555 | A1 * | 2/2009 | Mak-Fan | H04N 19/176 |
| | | | | 375/240.29 |
| 2011/0109624 | A1 * | 5/2011 | Greenberg | G06F 1/3203 |
| | | | | 345/419 |
| 2011/0157191 | A1 * | 6/2011 | Huang | G06F 1/3203 |
| | | | | 345/503 |

(Continued)

*Primary Examiner* — Anh-Tuan V Nguyen
(74) *Attorney, Agent, or Firm* — McClure, Qualey & Rodack, LLP (57) ABSTRACT

A frame rate control method is provided. The frame rate control method includes the following step: detecting a frame rate of an image signal generated by an image processing apparatus to generate a first detection result; detecting a system load on the image processing apparatus to generate a second detection result; and determining whether to provide a frame rate limit to limit the frame rate according to at least the first detection result and the second detection result.

20 Claims, 9 Drawing Sheets

(56) References Cited

U.S. PATENT DOCUMENTS

| | | | |
|---|---|---|---|
| 2012/0236927 A1* | 9/2012 | Nakagawa | H04N 7/0806 375/240.01 |
| 2012/0268605 A1* | 10/2012 | Sakamoto | H04N 7/181 348/159 |
| 2013/0335402 A1* | 12/2013 | Eriksson | H04N 13/0033 345/419 |
| 2014/0092103 A1* | 4/2014 | Saulters | G06F 15/00 345/501 |
| 2014/0184626 A1* | 7/2014 | Narayanan | G06T 1/60 345/545 |
| 2014/0204101 A1* | 7/2014 | Ramadoss | G06T 1/20 345/522 |
| 2015/0119142 A1* | 4/2015 | Abbott | G02B 27/01 463/31 |
| 2015/0264320 A1* | 9/2015 | Yuki | H04N 7/181 348/159 |
| 2015/0312572 A1* | 10/2015 | Owen | H04N 19/102 375/240.02 |
| 2016/0012795 A1* | 1/2016 | Banski | G06F 3/14 345/520 |
| 2016/0225339 A1* | 8/2016 | Kim | G09G 5/006 |
| 2016/0249011 A1* | 8/2016 | Lai | H04N 5/765 |
| 2017/0026486 A1* | 1/2017 | Tran | H04L 67/303 |

* cited by examiner

FRAME RATE CONTROL METHOD AND IMAGE PROCESSING APPARATUS SELECTIVELY LIMITING FRAME RATE

CROSS REFERENCE TO RELATED APPLICATIONS

This application claims the benefit of U.S. provisional application No. 62/246,623, filed on Oct. 27, 2015, the contents of which are incorporated herein by reference.

BACKGROUND

The disclosed embodiments of the present invention relate to frame rate control, and more particularly, to a frame rate control method which selectively provides a frame rate limit to stabilize a frame rate, and related image processing apparatus.

When an image processing apparatus operates in a scenario where a graphic processing unit (GPU) consumes a significant amount of power and game complexity is high, a system load of the image processing apparatus increases too much such that a system capacity cannot provide a stable frame rate. This results in a bad user experience.

One conventional method uses thermal throttling to limit power of an apparatus, which reduces a system capacity accordingly. However, as workload of the apparatus remains roughly the same, it still results in an unstable frame rate.

Thus, there is a need for a novel frame rate control mechanism to provide a stable frame rate.

SUMMARY

In accordance with exemplary embodiments of the present invention, a frame rate control method which selectively provides a frame rate limit to stabilize a frame rate, and related image processing apparatus are proposed to solve the above-mentioned problems.

According to an embodiment of the present invention, an exemplary frame rate control method is disclosed. The exemplary frame rate control method comprises the following step: detecting a frame rate of an image signal generated by an image processing apparatus to generate a first detection result; detecting a system load on the image processing apparatus to generate a second detection result; and determining whether to provide a frame rate limit to limit the frame rate according to at least the first detection result and the second detection result.

According to an embodiment of the present invention, an exemplary image processing apparatus is disclosed. The image processing apparatus comprises a processor and a frame rate controller. The processor is arranged for processing an image signal, detecting a frame rate of the image signal to generate a first detection result, and detecting a system load on the processor to generate a second detection result. The frame rate controller is coupled to the processor, and is arranged for determining whether to provide a frame rate limit to limit the frame rate according to at least the first detection result and the second detection result.

The proposed frame rate control mechanism may not only adaptively provide a frame rate limit according to system information (e.g. a system load and frame rate variations) and/or temperature information, but also dynamically adjust a current frame rate limit to thereby provide an enjoyable user viewing experience.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

The proposed frame rate control method may adaptively provide/adjust frame limit(s) in response to different operating scenarios (e.g. associated with frame rates and system loads) such that an output image signal may not only have a stable frame rate in different operating scenarios but also have high frame rate stability during operating scenario switching. As the proposed frame rate control method may stabilize a frame rate of an image signal, a system capacity may keep a stable frame rate and the user may have an enjoyable viewing experience. Further description is provided below.

Figure 1:
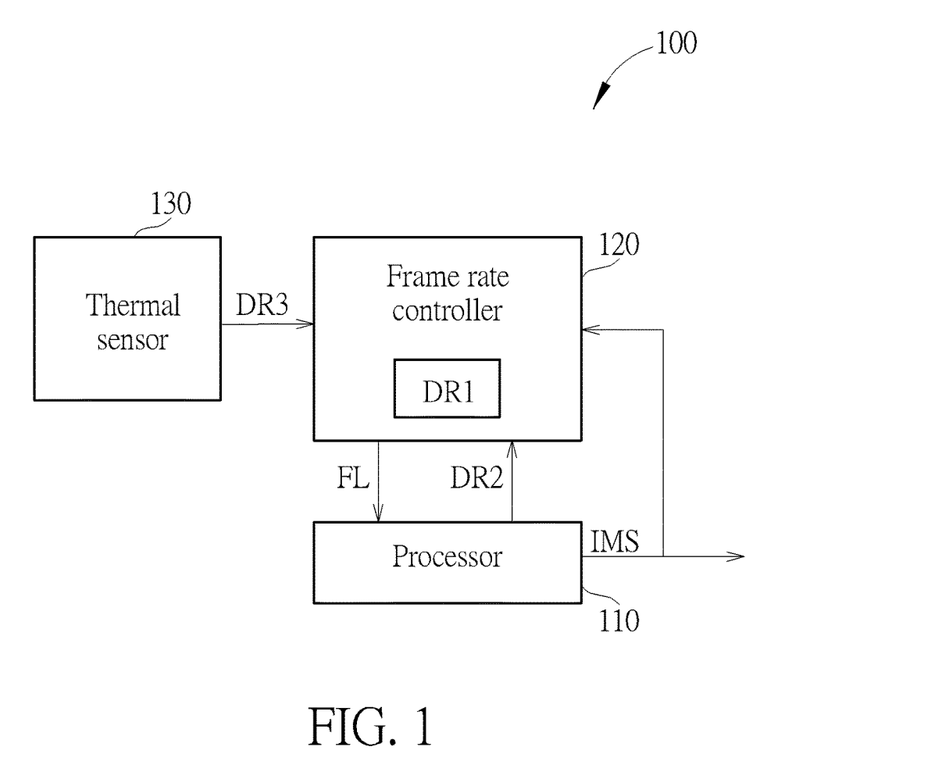
FIG. 1 is a block diagram illustrating an exemplary image processing apparatus according to an embodiment of the present invention.

Please refer to FIG. 1, which is a block diagram illustrating an exemplary image processing apparatus according to an embodiment of the present invention. The image processing apparatus 100 may include a processor 110 and a frame rate controller 120, wherein the frame rate controller 120 is coupled to the processor 110, and is arranged for controlling a frame rate of an image signal IMS outputted from the processor 110. For example, the frame rate 120 may detect the frame rate of the image signal IMS to generate a detection result DR1, and the processor 110 may detect a system load on the processor 110 to generate a detection result DR2. The frame rate controller 120 may determine whether to provide a frame rate limit FL to limit the frame rate of the image signal IMS according to at least the detection result DR1 and the detection result DR2.

In this embodiment, when the detection result DR1 indicates that variation(s) in the frame rate is too large, and the detection result DR2 indicates that the system load of the processor 110 is too large, the frame rate controller 120 may provide the frame rate limit FL to stabilize the frame rate of the image signal IMS. In addition, the processor 110 may be implemented by, but is not limited, an application processor, wherein the application processor may include a graphic processing unit (GPU), a central processing unit (CPU) and/or a memory unit (not shown in FIG. 1). Hence, the processor 110 may detect a processing load on the GPU, a processing load on the CPU and/or a bandwidth of the memory unit to generate the detection result DR2.

It should be noted that, before the frame rate controller 120 provides the frame rate limit FL to the processor 110, the processor 110 may generate the image signal IMS under a condition where no frame rate limit is imposed or under a condition where a frame rate limit different from the frame rate limit FL is imposed. Additionally, in a case where the processor 110 generates the image signal IMS according to the frame rate limit FL provided by the frame rate controller 120, the image processing apparatus 100 may continue performing frame rate control to determine whether to generate another frame rate limit (e.g. less than the frame rate limit FL). By way of example but not limitation, the frame rate controller 120 may continue detecting the frame rate of the image signal IMS, and the processor 110 may continue detecting the system load on the processor 110.

In an alternative embodiment, in addition to the detection result DR1 and the detection result DR2, the frame rate controller 120 may further refer to other limit criterion/criteria to determine whether to provide the frame rate limit FL. By way of example but not limitation, the image processing apparatus 100 may further include a thermal sensor 130, which is coupled to the frame rate controller 120 and is arranged for sensing a temperature of the image processing apparatus 100 to generate a detection result DR3. The frame rate controller 120 may determine whether to provide the frame rate limit FL according to the detection results DR1-DR3. Further description of the thermal sensor 130 is provided later.

Figure 2:
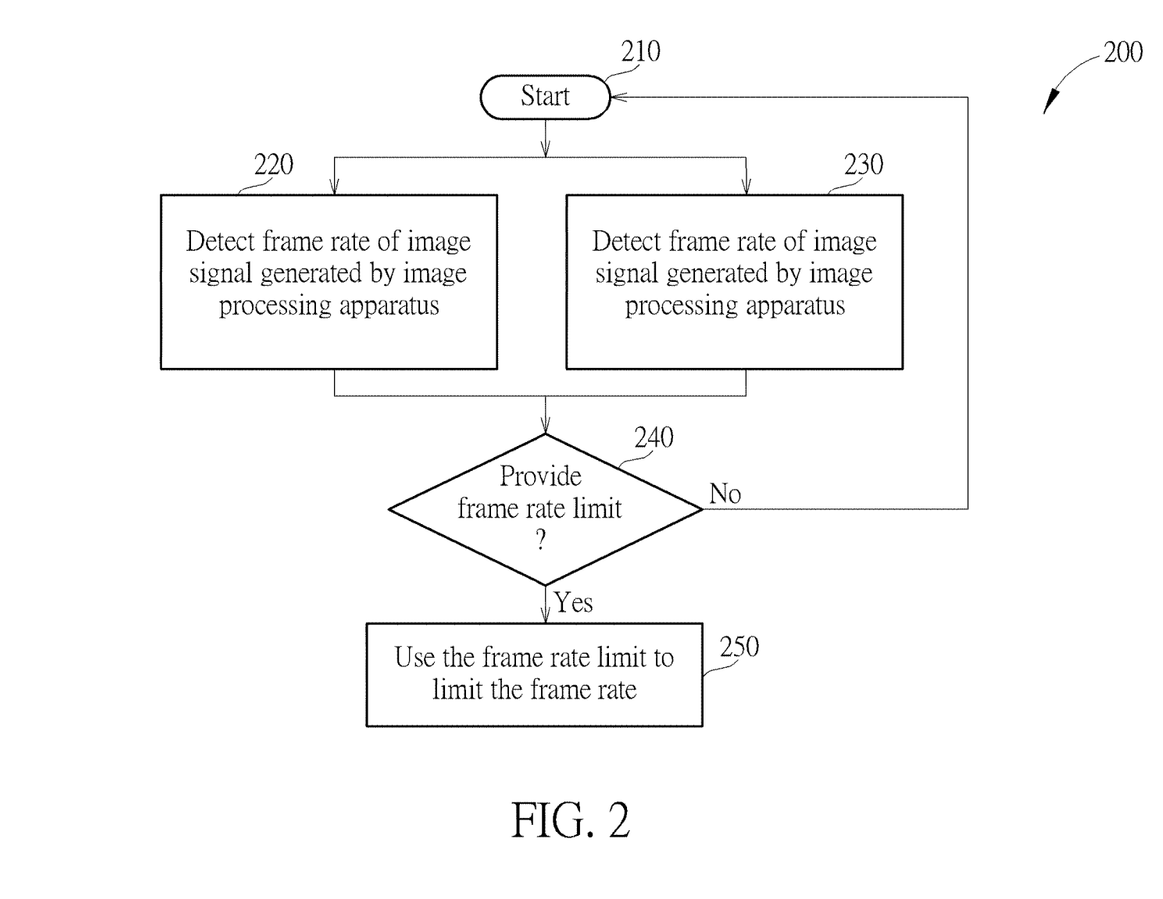
FIG. 2 illustrates a flow chart of an exemplary frame rate control method according to an embodiment of the present invention.

The frame rate control mechanism employed in the image processing apparatus 100 may be summarized in FIG. 2. FIG. 2 illustrates a flow chart of an exemplary frame rate control method according to an embodiment of the present invention. For illustrative purposes, the frame rate control method 200 shown in FIG. 2 is described with reference to the image processing apparatus 100 shown in FIG. 1. However, this is not meant to be a limitation of the present invention. In other words, the frame rate control method 200 is not limited to being employed in the image processing apparatus 100 shown in FIG. 1. Additionally, provided that the result is substantially the same, the steps are not required to be executed in the exact order shown in FIG. 2. Other intermediate steps can be added. The frame rate control method 200 shown in FIG. 2 may be summarized below.

Step 210: Start. For example, the image processing apparatus 100 may activate/enable the frame rate control mechanism.

Step 220: Detect the frame rate of the image signal IMS generated by the image processing apparatus 100 to generate the detection result DR1. For example, the frame rate controller 120 may detect the frame rate of the image signal IMS outputted by the processor 110, and accordingly generate the detection result DR1.

Step 230: Detect the system load on the image processing apparatus 100 to generate the detection result DR2. For example, the processor 110 may detect the system load on the processor 110 to generate the detection result DR2.

Step 240: Determine whether to provide the frame rate limit FL to limit the frame rate of the image signal IMS according to at least the detection result DR1 and the detection result DR2. If yes, go to step 250; otherwise, return to step 210. For example, the frame rate controller 120 may determine whether to provide the frame rate limit FL to limit the frame rate of the image signal IMS according to at least the detection result DR1 and the detection result DR2.

Step 250: Use the frame rate limit FL to limit the frame rate of the image signal IMS. For example, when determining that the frame rate limit FL is needed, the processor 110 may use the frame rate limit FL provided by the frame rate controller 120 to limit the frame rate of the image signal IMS.

Figure 3:
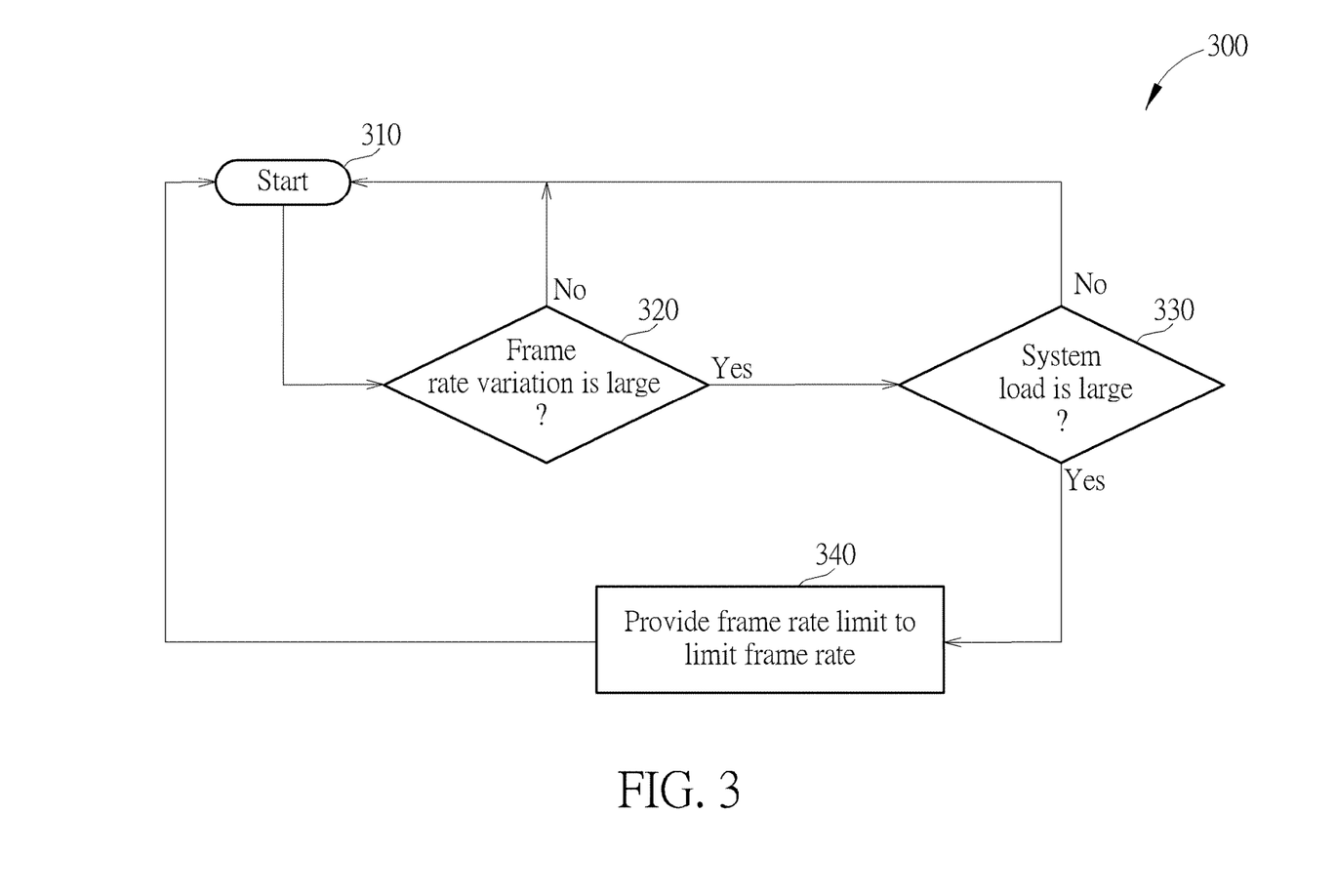
FIG. 3 is an implementation of the frame rate control method shown in FIG. 2.

In step 240, when the detection result DR1 indicates variation(s) in the frame rate of the image signal IMS is too large (e.g. the frame rate is too low, or a rate of change of the frame rate is too high), and the detection result DR2 indicates that the system load on the image processing apparatus 100 is too large (e.g. the image processing apparatus 100 operates in a scenario where a GPU thereof consumes a significant amount of power and game complexity is high), the image processing apparatus 100 may provide the frame rate limit FL to limit the frame rate of the image signal IMS. Please refer to FIG. 3, which is an implementation of the frame rate control method 200 shown in FIG. 2. In this implementation, the frame rate control method 300 may detect a frame rate of an image signal before detecting a system load. However, this is not meant to be a limitation of the present invention. In other words, provided that the result is substantially the same, the steps are not required to be executed in the exact order shown in FIG. 3. Further, for illustrative purposes, the frame rate control method 300 shown in FIG. 3 is described with reference to the image processing apparatus 100 shown in FIG. 1. The frame rate control method 300 shown in FIG. 3 may be summarized below.

Step 310: Start.

Step 320: Detect if a variation in the frame rate of the image signal IMS is large. If yes, go to step 330; otherwise, return to step 310.

Step 330: Detect if the system load on the image processing apparatus 100 is large. If yes, go to step 340; otherwise, return to step 310.

Step 340: Provide the frame rate limit FL to limit the frame rate of the image signal IMS.

In step 320, the frame rate controller 120 may refer to the detection result DR1 to determine whether the variation in the frame rate is large. Byway of example but not limitation, when the detection result DR1 indicates that the frame rate of the image signal IMS is less than a predetermined rate, the image processing apparatus 100 may determine whether the system load is large (i.e. executing step 330). In another example, when the detection result DR1 indicates that a rate of change of the frame rate of the image signal IMS is greater than a predetermined rate, the image processing apparatus 100 may determine whether the system load is large (i.e. executing step 330). In brief, as long as the stability of the frame rate can be detected, various modifications and alternatives fall within the scope of the prevent invention.

In step 330, the processor 110 may refer to the detection result DR2 to determine whether the system load is large. When it is determined that the system load is greater than a predetermined load, the image processing apparatus 100 may provide the frame rate limit FL to limit/stabilize the frame rate of the image signal IMS (i.e. executing step 340).

By way of example but not limitation, in a case where the processor 110 includes a GPU, the processor 110 may calculate a processing load on the GPU to generate the detection result DR2. When the detection result DR2 indicates that the processing load on the GPU is greater than a predetermined load, the frame rate controller 120 may provide the frame rate limit FL to the processor 110. In another case where the processor 110 includes a CPU, the processor 110 may calculate a processing load on the CPU to generate the detection result DR2. When the detection result DR2 indicates that the processing load on the CPU is greater than a predetermined load, the frame rate controller 120 may provide the frame rate limit FL to the processor 110. In yet another case where the processor 110 may include a memory unit, the processor 110 may calculate a bandwidth of the memory unit to generate the detection result DR2. When the detection result DR2 indicates that the bandwidth of the memory unit is greater than a predetermined bandwidth, the frame rate controller 120 may provide the frame rate limit FL to the processor 110. In still another case where the processor 110 may be implemented by an application processor including a GPU, a CPU and a memory unit, the processor may calculate at least one of a processing load on the GPU, a processing load on the CPU and a bandwidth of the memory unit so as to determine whether to provide the frame rate limit FL. It should be noted that as long as the system load (or a system overload) can be detected, various modifications and alternatives fall within the scope of the prevent invention.

Additionally, the image processing apparatus 100 may activate the frame control mechanism consecutively (periodically or aperiodically). For example, when it is detected that the variation in the frame rate of the image signal IMS is not large (step 320) or the system load is not large (step 330), the image processing apparatus 100 may return to step 310 to activate/enable the frame rate control mechanism again at a certain point in time, thereby performing frame rate detection and/or system load detection (i.e. proceeding to step 320/330 again). In another example, when it is detected that the variation in the frame rate of the image signal IMS is large (step 320) and the system load is large (step 330), the image processing apparatus 100 may execute step 340 and then return to step 310 to activate/enable the frame rate control mechanism again at a certain point in time.

Specifically, after the frame rate controller 120 provides the frame rate limit FL to limit the frame rate of the image signal IMS according to the detection result DR1 and the detection result DR2, when image processing apparatus 100 again detects that the variation in the frame rate of the image signal IMS is large (e.g. the frame rate is less than a predetermined rate, or the rate of change of the frame rate is greater than a predetermined rate; step 320) and the system load is large (e.g. the system load is greater than a predetermined load; step 330), the frame rate controller 120 may provide another frame rate limit lower than the frame rate limit FL according to the currently obtained detection results DR1 and DR2 so as to limit/stabilize the frame rate of the image signal IMS. In other words, the frame rate controller 120 may dynamically adjust a frame rate limit provided to the processor 110 according to the detection results DR1 and DR2.

Please note that in a case where the image processing apparatus 100 may activate the frame rate control mechanism periodically, the image processing apparatus 100 may execute step 310 (activating the frame rate control mechanism) every predetermined time interval (e.g. 10 seconds), and accordingly perform frame rate detection and/or system load detection to ensure stability of the frame rate. In some embodiments, the image processing apparatus 100 may further monitor and control instantaneous power(s)/temperature(s) thereof (e.g. a CPU/GPU temperature) every predetermined time interval (e.g. milliseconds). Hence, the proposed adaptive frame rate limit for stabilizing a frame rate may be regarded as a long-term frame rate control.

Figure 4:
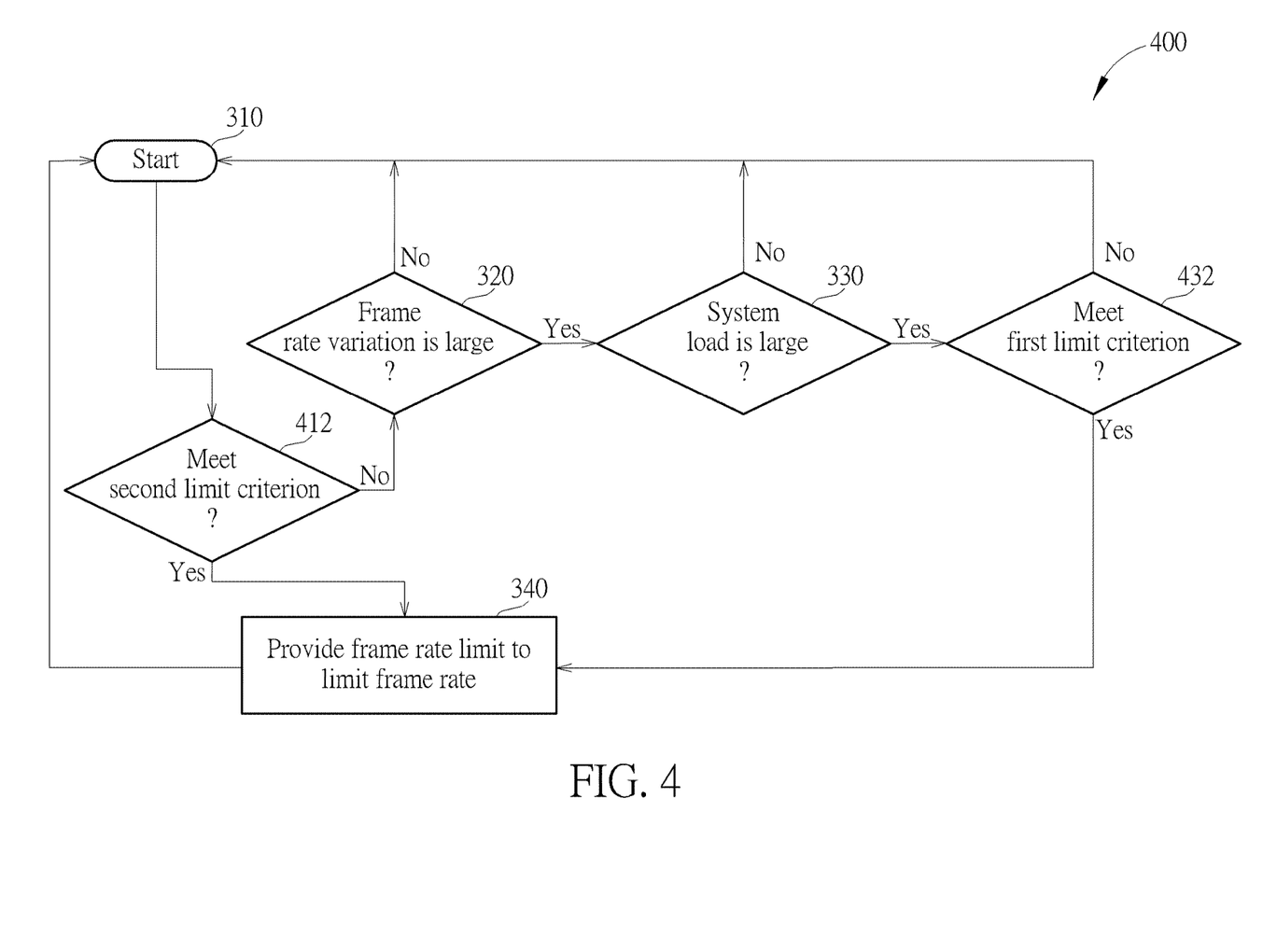
FIG. 4 is another implementation of the frame rate control method shown in FIG. 2

The proposed frame rate control mechanism may further refer to other criterion/criteria to adaptively provide a frame rate limit to thereby stabilize a frame rate of an image signal. FIG. 4 is another implementation of the frame rate control method 200 shown in FIG. 2, wherein the frame rate control method 400 is based on the frame rate control method 300 shown in FIG. 3, and the main difference is that the frame rate control method 400 further refers to limit criteria to determine whether to limit a frame rate. Specifically, in the implementation shown in FIG. 4, the frame rate control method 400 may include intermediate step(s) added prior to step 340 such that step 340 is performed when trigger condition(s) is met. For example, the frame rate control method 400 may provide a frame rate limit when a plurality of first trigger conditions are met, wherein the first trigger conditions may include, but is not limited to, a large frame rate variation, a large system load and satisfying a first limit criterion. In another example, the frame rate control method 400 may provide a frame rate limit as long as a second trigger condition (or a second limit criterion) is met.

For illustrative purposes, the frame rate control method 400 shown in FIG. 4 is described below with reference to the image processing apparatus 100 shown in FIG. 1. The frame rate control method 400 may be summarized below.

Step 310: Start.

Step 412: Determine if the second limit criterion is met. If yes, go to step 340; otherwise, go to step 320.

Step 320: Detect if a variation in the frame rate of the image signal IMS is large. If yes, go to step 330; otherwise, return to step 310.

Step 330: Detect if the system load on the image processing apparatus 100 is large. If yes, go to step 432; otherwise, return to step 310.

Step 432: Determine if the first limit criterion is met. If yes, go to step 340; otherwise, return to step 310.

Step 340: Provide the frame rate limit FL to limit the frame rate of the image signal IMS.

In this embodiment, the image processing apparatus 100 may execute steps 320, 330 and 432 to determine if the first trigger conditions are met, wherein when the first trigger conditions are met, the image processing apparatus 100 may execute step 340. In other words, the image processing apparatus 100 may determine whether to provide the frame rate limit FL according to the detection result DR1, the detection result DR2 and the first limit criterion. For example, in step 432, the frame rate controller 120 may determine if the first limit criterion is met, wherein when the first limit criterion is met, the frame rate controller 120 may determine whether to provide the frame rate limit FL to limit the frame rate according to the detection result DR1 and the detection result DR2. When the limit criterion is not met, the frame rate controller 120 may determine not to provide the frame rate limit FL.

The aforementioned first limit criterion may be any factor affecting the frame rate. In one implementation, the frame rate controller 120 may detect if a temperature of the image processing apparatus 100 is higher than or equal to a predetermined temperature in order to determine whether the first limit criterion is met, wherein the temperature of the image processing apparatus 100 may be, but is not limited to, a junction temperature of a die and/or a temperature of a circuit board inside the image processing apparatus 100. When it is detected that the temperature of the image processing apparatus 100 is higher than or equal to the predetermined temperature, the frame rate controller 120 may determine that the first limit criterion is met. For example, the thermal sensor 130 may be an on-chip thermal sensor used for sensing a junction temperature of a die (e.g. a CPU/GPU/memory junction temperature) to generate the detection result DR3. The frame rate controller 120 may accordingly determine if the first limit criterion is met. In another example, the thermal sensor 130 may be a thermal sensor disposed on a circuit board and is located near thermal source(s) such as the processor 110, a modem and/or a battery unit (not shown in FIG. 1). The thermal sensor 130 may detect a temperature of the circuit board to generate the detection result DR3 to thereby monitor temperature (s) of the thermal source (s), and the frame rate controller 120 may accordingly determine if the first limit criterion is met.

In another implementation, the frame rate controller 120 may detect if the image processing apparatus 100 operates in a gaming mode in order to determine whether the first limit criterion is met. When it is detected that the image processing apparatus 100 operates in the gaming mode, the frame rate controller 120 may determine that the first limit criterion is met.

In yet another implementation, the frame rate controller 120 may detect if a power level of the image processing apparatus 100 is higher than or equal to a predetermined level in order to determine whether the first limit criterion is met. When it is detected that the power level of the image processing apparatus 100 is higher than or equal to the predetermined level, the frame rate controller 120 may determine that the first limit criterion is met.

Additionally, the image processing apparatus 100 may execute step 412 to determine if the aforementioned second trigger condition is met. When the second trigger condition is met, the image processing apparatus 100 may execute step 340 to provide the frame rate limit FL; when the second trigger condition is not met, the image processing apparatus 100 may execute steps of determining if the first criterion/ criteria is met (e.g. at least one of steps 320, 330 and 432). For example, in step 412, the frame rate controller 120 may determine if the second limit criterion is met. When the second limit criterion is met, the frame rate controller 120 may provide the frame rate limit FL to the processor 110 to limit the frame rate; when the second limit criterion is not met, the frame rate controller 120 may execute step 320 to determine if a frame rate variation is too large. It should be noted that, as the order of steps 320, 330 and 432 shown in FIG. 4 is for illustrative purposes only and is not meant to be a limitation of the present invention, the frame rate controller 120 may execute step 330 or 432 first when the second limit criterion is not met. In brief, when the second limit criterion is not met, at least one of steps 320, 330 and 432 may be executed.

In one embodiment, the aforementioned second limit criterion may be any factor independent of the first trigger conditions. By way of example but not limitation, the frame rate controller 120 may detect if a power level (e.g. an instantaneous power level) of the image processing apparatus 100 is higher than or equal to a predetermined level in order to determine whether the second limit criterion is met. When it is detected that the power level of the image processing apparatus 100 is higher than or equal to the predetermined level, the frame rate controller 120 may determine that the second limit criterion is met.

Figure 5:
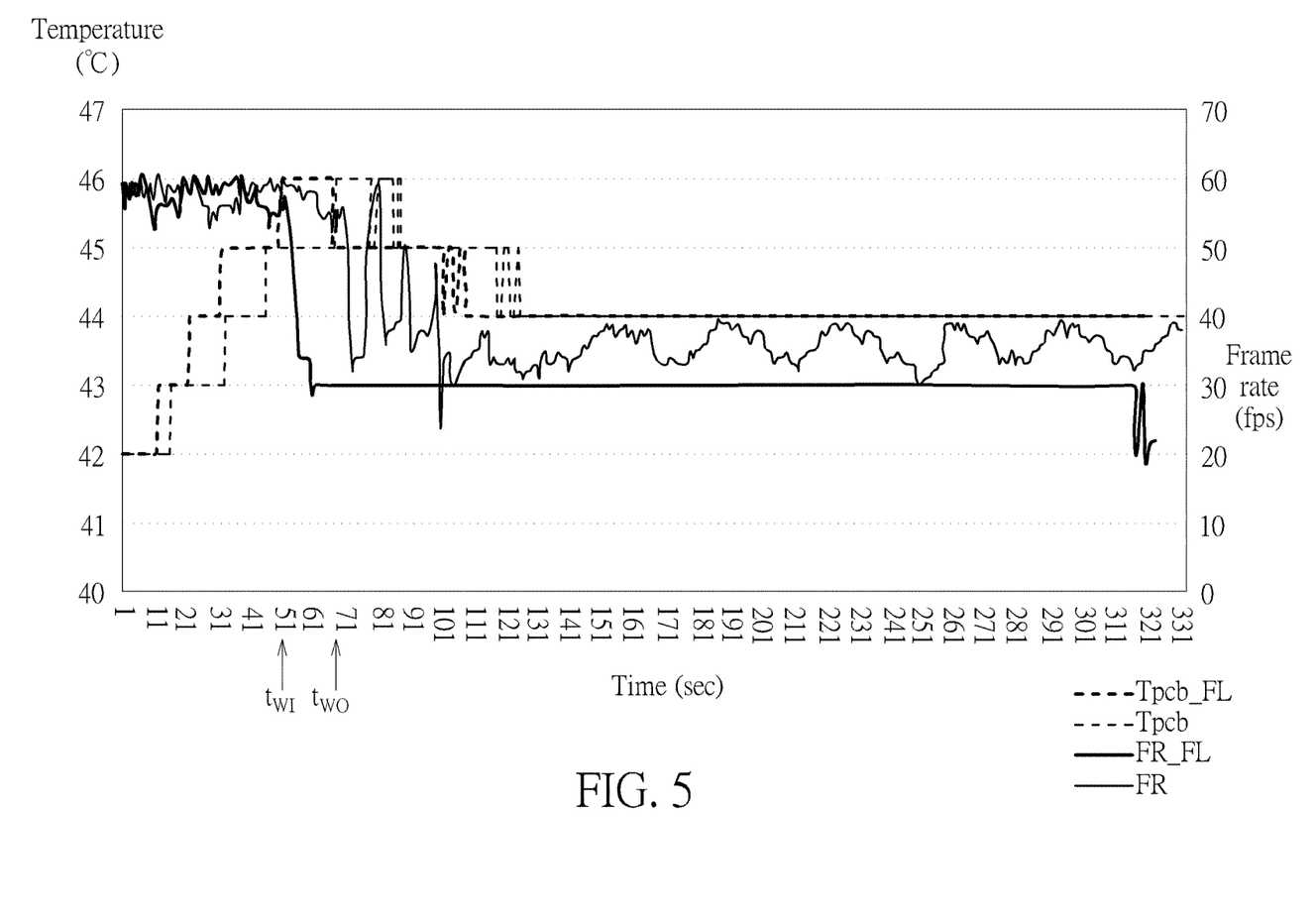
FIG. 5 illustrates a timing diagram associated with the frame rate and the temperature of the image processing apparatus shown in FIG. 1 according to an embodiment of the present invention.

FIG. 5 illustrates a timing diagram associated with the frame rate and the temperature of the image processing apparatus 100 shown in FIG. 1 according to an embodiment of the present invention. For an understanding of advantages of the proposed frame rate control mechanism, the a timing diagram shown in FIG. 5 further illustrates a frame rate and a temperature of a conventional image processing apparatus using thermal throttling. In this embodiment, a circuit board temperature and a frame rate corresponding to the image processing apparatus 100 are labeled Tpcb_FL and FR_FL respectively, and a circuit board temperature and a frame rate corresponding to the conventional image processing apparatus using thermal throttling are labeled Tpcb and FR respectively.

As shown in FIG. 5, a system load of the conventional image processing apparatus is so large at a point in time $t_{wo}$ such that the circuit board temperature Tpcb is too high and the frame rate FR starts fluctuating greatly. Hence, the conventional image processing apparatus uses thermal throttling to limit a power level thereof. The circuit board temperature Tpcb and the system capacity of the conventional image processing apparatus reduce accordingly. However, as the workload remains roughly the same, the frame rate FR still fluctuates. For example, in a case where the conventional image processing apparatus operates in a gaming mode, the frame rate FR still conventional image processing apparatus in response to changes in game scenarios, resulting in an unpleasant viewing experience.

Regarding the image processing apparatus 100, when the detection result DR1 indicates that a rate of change of the frame rate FR_FL is greater than a predetermined rate, the detection result DR2 indicates that the system load is larger than a predetermined load, and the detection result DR3 indicates that the circuit board temperature Tpcb_FL is higher than or equal to a predetermined temperature (at a point in time $t_{WI}$), the frame rate controller 120 may provide the frame rate limit FL. By way of example but not limitation, the frame rate controller 120 may provide the frame rate limit FL (30 fps) to lower the frame rate FR_FL, wherein the circuit board temperature Tpcb_FL decreases accordingly. It should be noted that as the system capacity of the image processing apparatus 100 does not reduce, and the processor 110 may output the image signal IMS having the stable frame rate FR_FL, the image processing apparatus 100 can still provide an enjoyable viewing experience.

Figure 6:
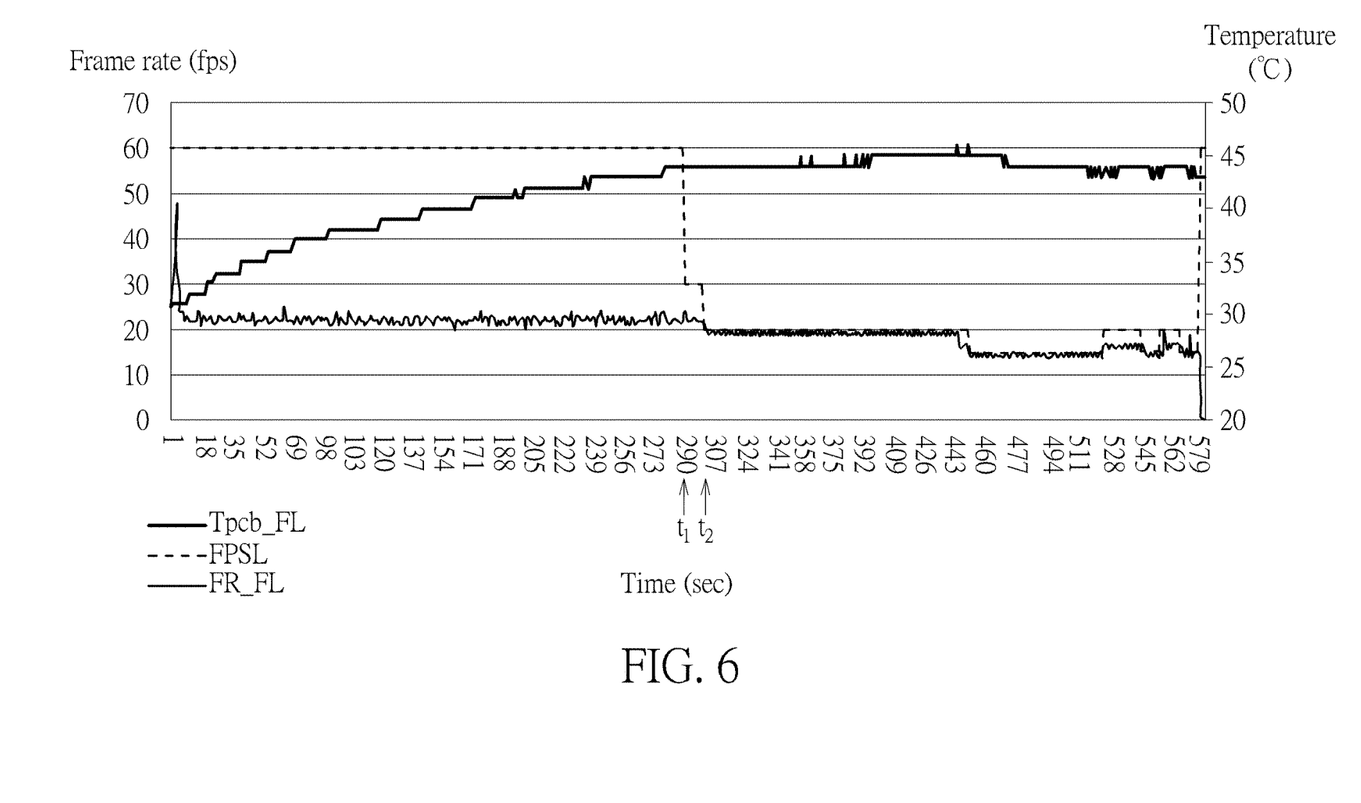
FIG. 6 illustrates a timing diagram associated with the provision of the frame rate limit shown in FIG. 1 according to an embodiment of the present invention.

FIG. 6 illustrates a timing diagram associated with the provision of the frame rate limit FL shown in FIG. 1 according to an embodiment of the present invention. In this embodiment, a frame rate, a current frame rate limit and a circuit board temperature corresponding to the image processing apparatus 100 are labeled FR_FL, FPSL and Tpcb_FL respectively. As shown in FIG. 6, before a point in time $t_1$, the current frame rate limit FPSL of the image processing apparatus 100 equals to 60 fps (i.e. a frame rate limit FL'). When the frame rate controller 120 determines that the circuit board temperature Tpcb_FL is too high, and therefore decides to provide the frame limit FL (at the point in time $t_1$), the frame rate controller 120 may provide a frame rate limit FL" first, and then provide the frame limit FL as the current frame rate limit FPSL (at a point in time $t_2$) to stabilize the frame rate FR_FL. In other words, the frame rate controller 120 may lower a level of the current frame rate limit FPSL in multiple stages or in a stepwise manner (i.e. providing multiple frame rate limits or frame rate limit levels in sequence).

Figure 7:
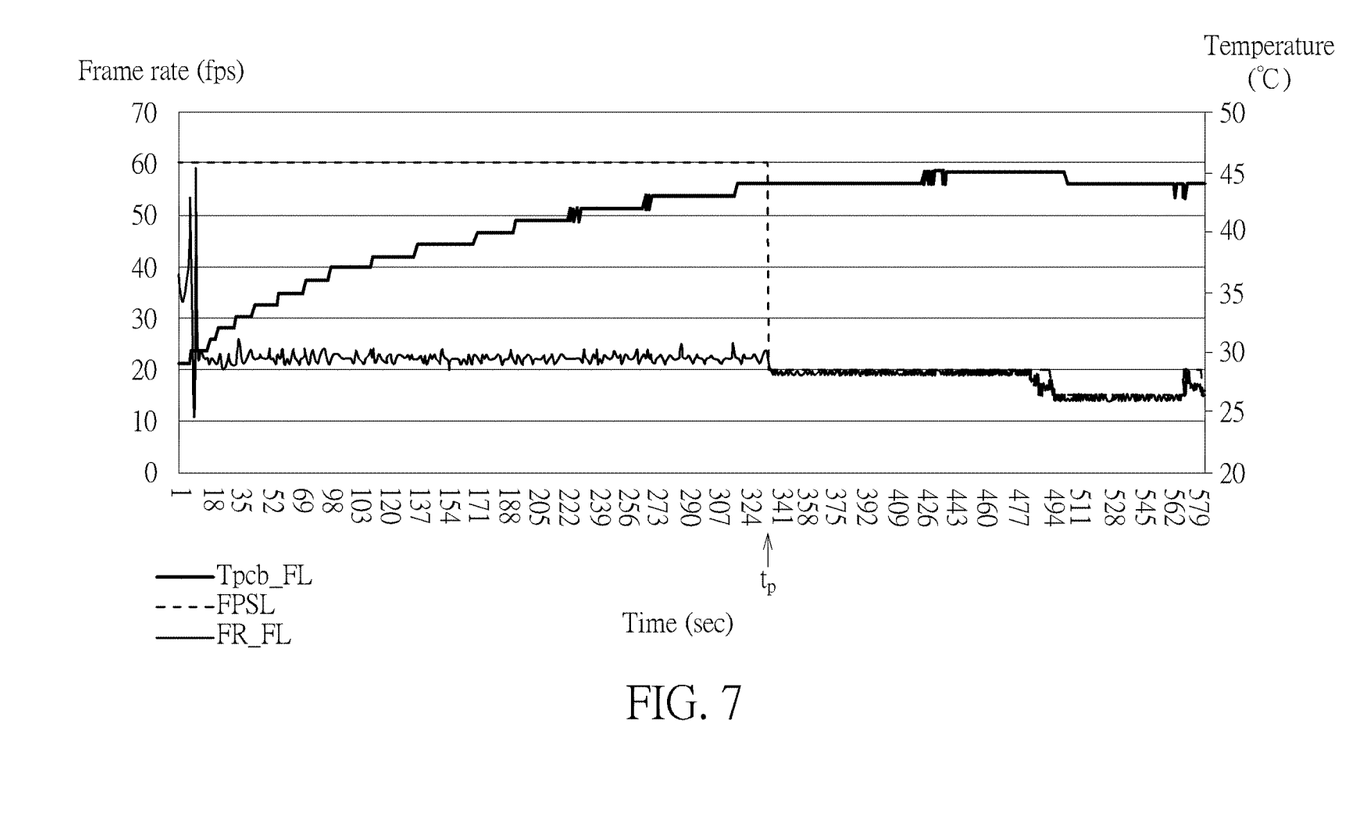
FIG. 7 illustrates a timing diagram associated with the provision of the frame rate limit shown in FIG. 1 according to another embodiment of the present invention.

FIG. 7 illustrates a timing diagram associated with the provision of the frame rate limit FL shown in FIG. 1 according to another embodiment of the present invention. The main difference between the embodiments shown in FIG. 6 and FIG. 7 is that the frame rate controller 120 may refer to the frame rate FR_FL to provide the frame rate limit FL in the embodiment shown in FIG. 7. For example, in one implementation, when the frame rate controller 120 determines that the circuit board temperature Tpcb_FL is too high, and therefore decides to provide the frame limit FL (at the point in time $t_p$), the processor 110 (or the frame rate controller 120) may detect the frame rate FR_FL of the image signal IMS directly (e.g. obtaining the frame rate FR_FL from a GPU driver), and the frame rate controller 120 may provide/calculate the frame rate FR_FL accordingly.

In another implementation, when the frame rate controller 120 determines that the circuit board temperature Tpcb_FL is too high, and therefore decides to provide the frame limit FL (at the point in time $t_p$), the processor 110 (or the frame rate controller 120) may obtain information from an application programming interface (API) to calculate the current frame rate FR_FL, thereby providing/calculating the frame rate FL according to the calculated frame rate FR_FL. Byway of example but not limitation, the processor 110 (or the frame rate controller 120) may calculate the current frame rate FR_FL according to the number of calling eglSwapBuffers( ) per second, wherein eglSwapBuffers( ) is a function invoked when Open Graphics Library (OpenGL) completes a scene and wants to switch a back buffer to a front buffer such that a displayed frame will be updated accordingly. In another example, the processor 110 (or the frame rate controller 120) may calculate the current frame rate FR_FL according to the number of calling set( ) in overlay per second, wherein set( ) is a function invoked when image frames are overlaid and outputted to a display.

It should be noted that the derivation of the current frame rate described above is for illustrative purposes only and is not meant to be a limitation of the present invention. As long as a frame limit may be provided to limit a frame rate of an image signal, associated modifications and alternatives fall within the scope of the present invention. Additionally, by obtaining the current frame rate to provide a frame rate limit, the proposed frame rate control mechanism may set the frame rate limit quickly/precisely. For example, compared to the embodiment shown in FIG. 6, the frame rate FL is provided in one stage in the embodiment shown in FIG. 7.

Figure 8:
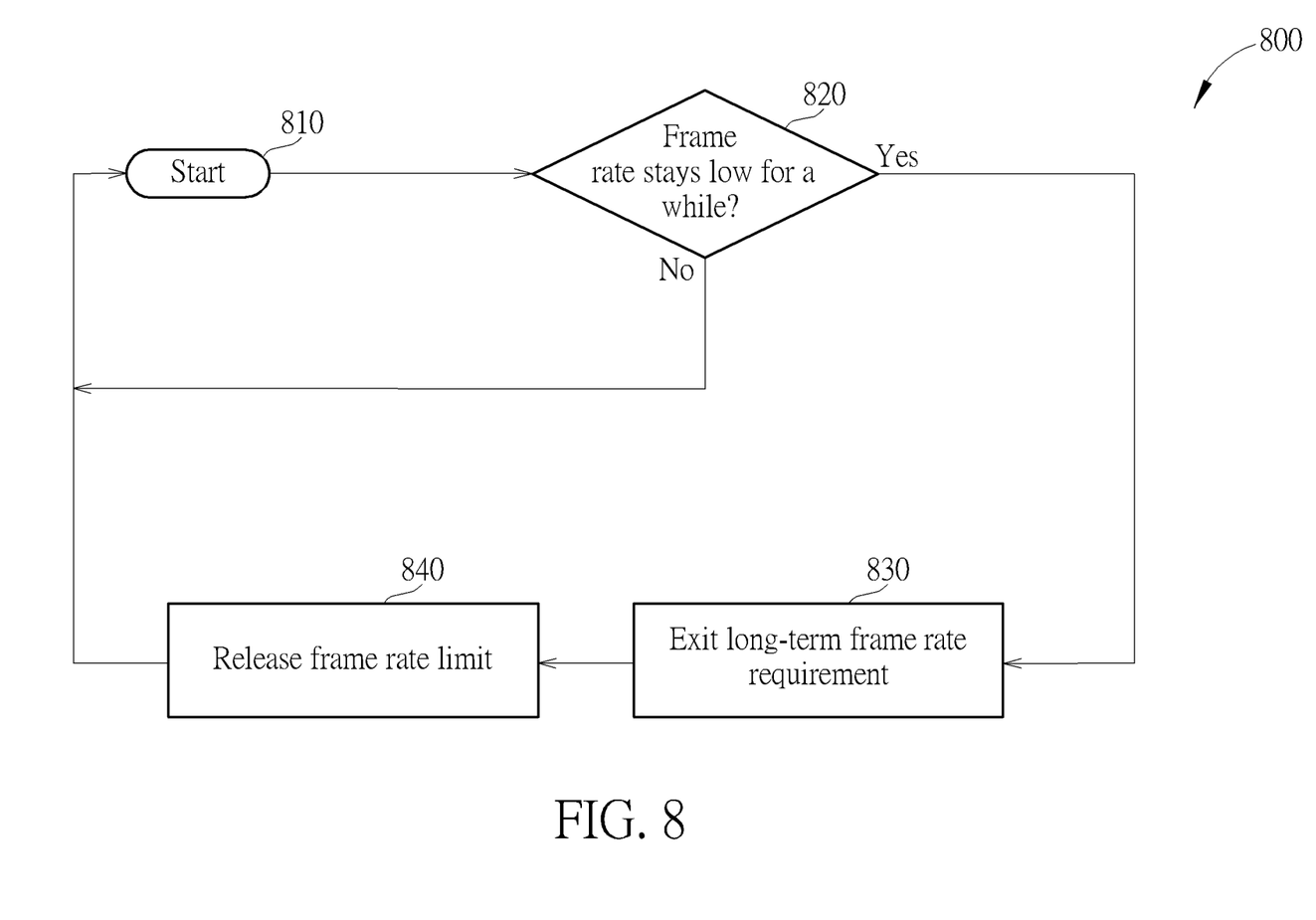
FIG. 8 is a flow chart of an exemplary frame control method according to an embodiment of the present invention.

In order to quickly/precisely set a frame rate limit, the proposed frame rate control mechanism may quickly release/remove the frame rate limit. Please refer to FIG. 8, which is a flow chart of an exemplary frame control method according to an embodiment of the present invention. For illustrative purposes, the frame control method 800 shown in FIG. 8 is described with reference to the image processing apparatus 100 shown in FIG. 1. However, this is not meant to be a limitation of the present invention. In addition, provided that the result is substantially the same, the steps are not required to be executed in the exact order shown in FIG. 8. Other intermediate steps can be added. The frame control method 800 shown in FIG. 8 may be summarized below.

Step 810: Start. For example, after providing the frame rate limit FL, the image processing apparatus 100 may active/enable the frame rate control mechanism to determine whether to remove/release the frame rate limit FL.

Step 820: Determine if a release criterion is met. If yes, go to step 830; otherwise, return to step 810. By way of example but not limitation, the frame rate controller 120 may detect if the frame rate of the image signal IMS stays low for a while. When it is detected that the frame rate of the image signal IMS stays low for a while, the frame rate controller 120 may determine that the release criterion is met.

Step 830: Exit long-term frame rate requirement(s) such as settings for limiting the frame rate. For example, when it is determined that the release criterion is met, the image processing apparatus 100 may adjust associated frame rate settings (e.g. releasing the frame rate limit FL) to thereby exit the long-term frame rate requirement(s).

Step 840: Release or remove a frame rate limit. For example, the frame rate controller 120 may remove/release the current frame rate limit FL such that the frame rate is not limited by the frame rate limit FL.

In step 820, the frame rate controller 120 may detect the frame rate of the image signal IMS stays less than a predetermined rate for a specific period of time. When it is detected that the frame rate stays less than the predetermined rate for a specific period of time, the frame rate controller 120 may determine that the release criterion is met. For example, when the image processing apparatus 100 exits a gaming mode where the frame rate limit FL equals to 30 fps, and returns to a main menu, the frame rate controller 120 may detects that the frame rate of the image signal IMS stays less than 5 fps for one second. As a frame rate required for touch operations on the main menu may be higher than the frame rate limit FL, the frame rate controller 120 may remove/release the frame rate limit FL such that the image processing apparatus 100 may exit the long-term frame rate requirement(s) (steps 830 and 840).

Additionally, in step 840, the image processing apparatus 100 may quickly exit the long-term frame rate requirement(s) by removing/releasing the frame rate limit FL. For example, in one implementation, the frame rate controller 120 remove the frame rate limit FL in one stage, and a current frame rate limit of the image processing apparatus 100 may return to an initial/previous setting from the frame rate limit FL accordingly (e.g. from 30 fps back to 60 fps, or to a setting where no frame rate limit is imposed). In another implementation, the frame rate controller 120 may provide another frame rate limit greater than the frame rate limit FL, and replace the frame rate limit FL with the another frame rate limit. Specifically, the frame rate controller 120 may release a frame rate limit in multiple stages or in a stepwise manner, and a current frame rate limit of the image processing apparatus 100 may return to an initial/previous setting from the frame rate limit FL accordingly (e.g. from 30 fps to 40 fps, and then from 40 fps back to 60 fps).

It should be noted that, in this embodiment, a time interval between two consecutive detections performed on the frame rate to generate the detection result DR1 (e.g. 10 seconds) is longer than a time interval between two consecutive detections performed on the frame rate to detect if the frame rate is less than the predetermined rate (e.g. 1 second). Hence, even if the image processing apparatus 100 exits the gaming mode suddenly and enters a menu mode, the image processing apparatus 100 may detect a change in operating scenarios immediately, thereby providing a flexible frame rate control mechanism.

In some embodiments, the proposed frame rate control mechanism may perform frame rate limiting operations and frame rate releasing operations concurrently. Please refer to FIG. 9, which is a flowchart of an exemplary frame rate control method according to an embodiment of the present invention. The frame rate control method 900 is based on the frame rate control method 300 shown in FIG. 3, wherein the main difference is that the frame rate control method 900 further refers to limit criterion/criteria to determine whether to provide a frame rate limit and refers to release criteria to determine whether to release the frame rate limit. For illustrative purposes, the frame rate control method 900 is described with reference to the image processing apparatus 100 shown in FIG. 1. Provided that the result is substantially the same, the steps are not required to be executed in the exact order shown in FIG. 9. Other intermediate steps can be added. The frame rate control method 900 may be summarized below.

Figure 9:
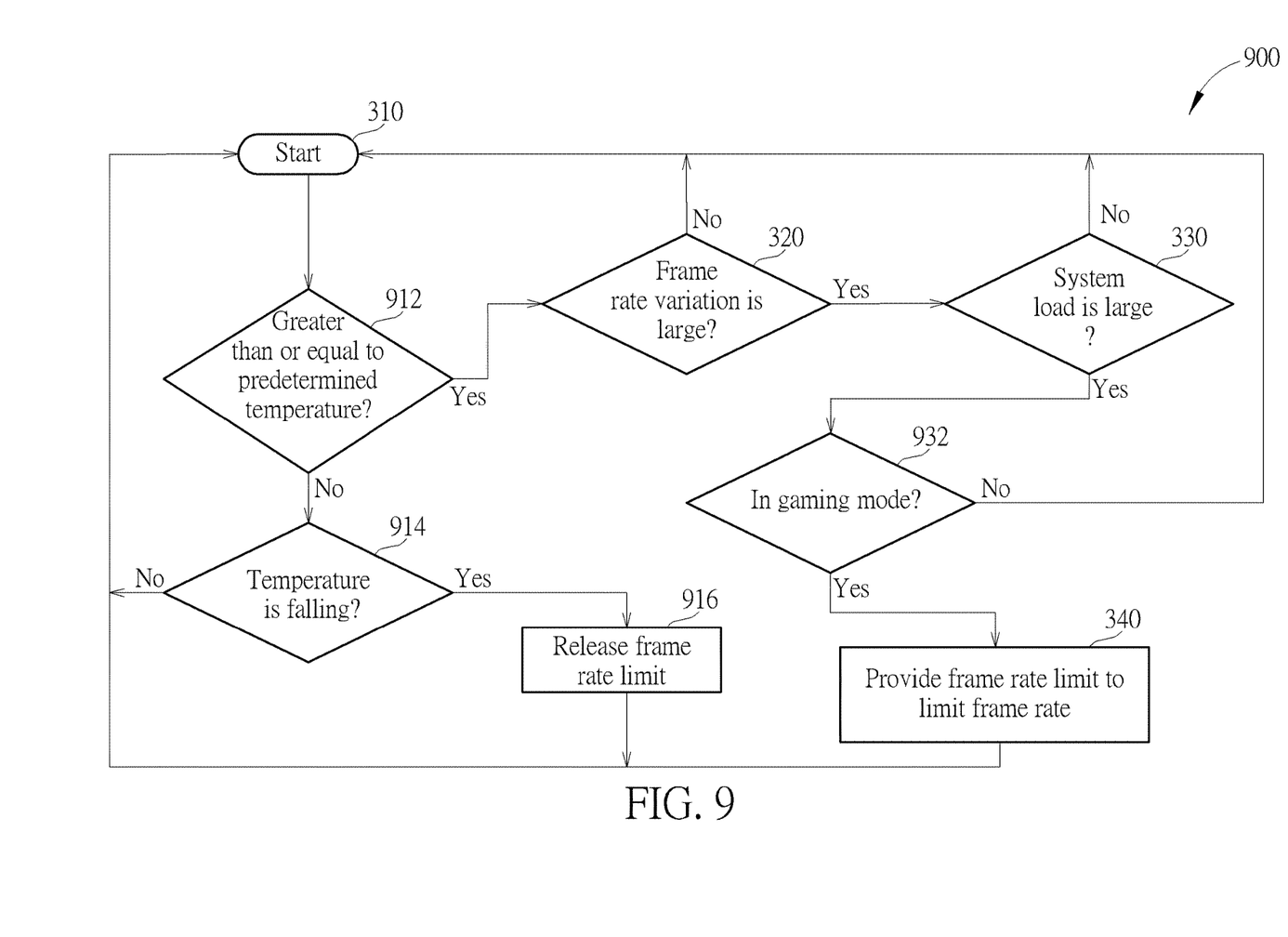
FIG. 9 is a flowchart of an exemplary frame rate control method according to an embodiment of the present invention.

Step 310: Start.

Step 912: Determine if a temperature of the image processing apparatus 100 is higher than or equal to a predetermined temperature. If yes, go to step 320; otherwise, go to step 914.

Step 914: Determine if the temperature of the image processing apparatus 100 is falling/decreasing. If yes, go to step 916; otherwise, return to step 310.

Step 916: Release a frame rate limit (a current frame rate limit such as the frame rate limit FL).

Step 320: Detect if a variation in the frame rate of the image signal IMS is large. If yes, go to step 330; otherwise, return to step 310.

Step 330: Detect if the system load on the image processing apparatus 100 is large. If yes, go to step 932; otherwise, return to step 310.

Step 932: Determine if the image processing apparatus 100 operates in a gaming mode. If yes, go to step 340; otherwise, return to step 310.

Step 340: Provide the frame rate limit FL to limit the frame rate of the image signal IMS.

In this embodiment, step 916 may be implemented by step 840 shown in FIG. 8. In other words, the image processing apparatus 100 may release frame rate limit FL in one stage or in multiple stages (e.g. in a stepwise manner). As one skilled in the art should understand operations associated with proposed frame rate limiting and releasing after reading the above paragraphs directed to FIGS. 1-8, similar description is not repeated here for brevity.

In an alternative embodiment, it is possible to replace step 932 with other limit criterion. In another alternative embodiment, step 932 may be optional.

Further, steps 912, 914 and 916 may be optional. For example, in a case where thermal throttling is utilized in the image processing apparatus 100, it is possible to remove steps 912, 914 and 916 from the flow chart shown in FIG. 9.

It should be noted that, even after providing the frame rate limit and/or releasing the frame rate limit, the image processing apparatus 100 may perform step 310 again to continue performing frame rate control. In other words, the proposed frame rate control mechanism may not only adaptively provide a frame rate limit according to system information (e.g. a system load and frame rate variations) and/or temperature information, but also dynamically adjust a current frame rate limit to thereby provide an enjoyable user viewing experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frame rate control method, comprising:
   detecting a frame rate of an image signal generated by an image processing apparatus to generate a first detection result;
   detecting a system load on the image processing apparatus to generate a second detection result;
   detecting if a temperature of the image processing apparatus is higher than or equal to a predetermined temperature; and
   when the temperature is higher than or equal to the predetermined temperature, determining whether to provide a frame rate limit to limit the frame rate according to the first detection result and the second detection result;
   wherein when the first detection result indicates that a variation in the frame rate is greater than a predetermined rate and the second detection result indicates that the system load is greater than a predetermined load, it is determined to provide the frame rate limit, and when the first detection result indicates that the variation in the frame rate is greater than the predetermined rate and the second detection result indicates that the system load is less than the predetermined load, it is determined not to provide the frame rate limit.

2. A frame rate control method, comprising:
   detecting a frame rate of an image signal generated by an image processing apparatus to generate a first detection result;
   detecting a system load on the image processing apparatus to generate a second detection result; and
   determining whether to provide a frame rate limit to limit the frame rate according to at least the first detection result and the second detection result;
   wherein when the first detection result indicates that a variation in the frame rate is greater than a first predetermined rate and the second detection result indicates that the system load is greater than a predetermined load, it is determined to provide the frame rate limit, and when the first detection result indicates that the variation in the frame rate is greater than the first predetermined rate and the second detection result indicates that the system load is less than the predetermined load, it is determined not to provide the frame rate limit.

3. The frame rate control method of claim 2, wherein when the first detection result indicates that a rate of change of the frame rate is greater than a second predetermined rate, and the second detection result indicates that the system load is greater than the predetermined load, it is determined to provide the frame rate limit.

4. The frame rate control method of claim 2, wherein after the frame rate limit is provided to limit the frame rate, the frame rate control method further comprises:
   detecting if a rate of change of the frame rate is greater than a second predetermined rate and the system load is greater than the predetermined load; and when the rate of change of the frame rate is greater than the second predetermined rate and the system load is greater than the predetermined load, providing another frame rate limit lower than the frame rate limit to limit the frame rate.

5. The frame rate control method of claim 2, wherein the image processing apparatus comprises a graphic processing unit, and the step of detecting the system load on the image processing apparatus to generate the second detection result comprises:
calculating a processing load on the graphic processing unit to generate the second detection result.

6. The frame rate control method of claim 2, wherein the image processing apparatus comprises a memory unit, and the step of detecting the system load on the image processing apparatus to generate the second detection result comprises:
calculating a bandwidth of the memory unit to generate the second detection result.

7. The frame rate control method of claim 2, wherein the image processing apparatus comprises a central processing unit, and the step of detecting the system load on the image processing apparatus to generate the second detection result comprises:
calculating a processing load on the central processing unit to generate the second detection result.

8. The frame rate control method of claim 2, wherein the step of determining whether to provide the frame rate limit to limit the frame rate according to at least the first detection result and the second detection result comprises:
determining if a limit criterion is met;
when the limit criterion is met, determining whether to provide the frame rate limit to limit the frame rate according to the first detection result and the second detection result; and
when the limit criterion is not met, determining not to provide the frame rate limit.

9. The frame rate control method of claim 8, wherein the step of determining if the limit criterion is met comprises:
detecting if a temperature of the image processing apparatus is higher than or equal to a predetermined temperature;
wherein when the temperature is higher than or equal to the predetermined temperature, it is determined that the limit criterion is met.

10. The frame rate control method of claim 8, wherein the step of determining if the limit criterion is met comprises:
detecting if the image processing apparatus operates in a gaming mode;
wherein when the image processing apparatus operates in the gaming mode, it is determined that the limit criterion is met.

11. The frame rate control method of claim 8, wherein the step of determining if the limit criterion is met comprises:
detecting if a power level of the image processing apparatus is higher than or equal to a predetermined level;
wherein when the power level of the image processing apparatus is higher than or equal to the predetermined level, it is determined that the limit criterion is met.

12. The frame rate control method of claim 2, further comprising:
determining if a limit criterion is met; and
when the limit criterion is met, providing the frame rate limit to limit the frame rate;
wherein when the limit criterion is not met, at least one of the step of detecting the frame rate of the image signal generated by the processor to generate the first detection result and the step of detecting the system load on the image processing apparatus to generate the second detection result is executed.

13. The frame rate control method of claim 12, wherein the step of determining if the limit criterion is met comprises:
detecting if a power level of the image processing apparatus is higher than or equal to a predetermined level;
wherein when the power level of the image processing apparatus is higher than or equal to the predetermined level, it is determined that the limit criterion is met.

14. The frame rate control method of claim 2, wherein when it is determined to provide the frame rate limit to limit the frame rate, the frame rate control method further comprises:
referring to the frame rate to provide the frame rate limit.

15. The frame rate control method of claim 2, wherein after the frame rate limit is provided to limit the frame rate, the frame rate control method further comprises:
determining if a release criterion is met; and
when the release criterion is met, removing the frame rate limit such that the frame rate is not limited by the frame rate limit.

16. The frame rate control method of claim 15, wherein the step of determining if the release criterion is met comprises:
detecting if the frame rate stays less than a second predetermined rate for a specific period of time;
wherein when the frame rate stays less than the second predetermined rate for the specific period of time, it is determined that the release criterion is met.

17. The frame rate control method of claim 16, wherein a first time interval between two consecutive detections performed on the frame rate to generate the first detection result is longer than a second time interval between two consecutive detections performed on the frame rate to detect if the frame rate is less than the second predetermined rate.

18. The frame rate control method of claim 15, wherein the step of determining if the release criterion is met comprises:
detecting if a temperature of the image processing apparatus is lower than a predetermined temperature and is decreasing; and
wherein when the temperature of the image processing apparatus is lower than the predetermined temperature and is decreasing, it is determined that the release criterion is met.

19. The frame rate control method of claim 15, wherein the step of removing the frame rate limit comprises:
providing another frame rate limit greater than the frame rate limit, and replacing the frame rate limit with the another frame rate limit.

20. An image processing apparatus, comprising:
a frame rate controller, for detecting a frame rate of an image signal to generate a first detection result, and determining whether to provide a frame rate limit to limit the frame rate according to at least the first detection result and a second detection result; and
a processor, coupled to the frame rate controller, the processor arranged for detecting a system load on the processor to generate the second detection result;
wherein when the first detection result indicates that a variation in the frame rate is greater than a predetermined rate and the second detection result indicates that the system load is greater than a predetermined load, it is determined to provide the frame rate limit, and when the first detection result indicates that the variation in the frame rate is greater than the predetermined rate and the second detection result indicates that the system load is less than the predetermined load, it is determined not to provide the frame rate limit.

\* \* \* \* \*